(12) United States Patent
Schneiter

(10) Patent No.: US 11,249,822 B2
(45) Date of Patent: Feb. 15, 2022

(54) METHOD AND DEVICE FOR ALERTING THAT AN EVENT HAS OCCURRED

(71) Applicant: ORANGE, Paris (FR)

(72) Inventor: Christian Schneiter, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/470,400

(22) PCT Filed: Dec. 19, 2017

(86) PCT No.: PCT/FR2017/053696
§ 371 (c)(1),
(2) Date: Jun. 17, 2019

(87) PCT Pub. No.: WO2018/115717
PCT Pub. Date: Jun. 28, 2018

(65) Prior Publication Data
US 2019/0310902 A1    Oct. 10, 2019

(30) Foreign Application Priority Data

Dec. 19, 2016   (FR) ...................................... 1662718

(51) Int. Cl.
*G06F 9/54*     (2006.01)
*G06Q 30/02*    (2012.01)
*H04L 12/24*    (2006.01)
*G06N 20/00*    (2019.01)
*H04L 12/58*    (2006.01)

(52) U.S. Cl.
CPC ............ *G06F 9/542* (2013.01); *G06N 20/00* (2019.01); *G06Q 30/0258* (2013.01); *H04L 41/06* (2013.01); *H04L 51/02* (2013.01); *H04L 51/046* (2013.01)

(58) Field of Classification Search
None
See application file for complete search history.

(56) References Cited

U.S. PATENT DOCUMENTS

| | | | | |
|---|---|---|---|---|
| 5,721,825 | A * | 2/1998 | Lawson ................... | G06F 9/542 709/203 |
| 6,456,852 | B2 * | 9/2002 | Bar .......................... | G01S 5/02 455/456.1 |
| 7,792,874 | B1 * | 9/2010 | Clarke ................. | H04L 41/0604 707/803 |
| 8,701,102 | B2 * | 4/2014 | Appiah ..................... | G06F 8/65 717/171 |
| 9,043,407 | B1 | 5/2015 | Gaulke et al. | |
| 9,386,113 | B1 | 7/2016 | Goncharuk et al. | |
| 10,210,226 | B2 * | 2/2019 | Harden ............... | G06F 16/9535 |
| 10,223,432 | B2 * | 3/2019 | Harden ................... | H04L 51/32 |
| 10,229,202 | B2 * | 3/2019 | Li ........................... | H04L 67/16 |

(Continued)

*Primary Examiner* — Umut Onat
(74) *Attorney, Agent, or Firm* — Faegre Drinker Biddle & Reath LLP

(57) ABSTRACT

A method is proposed for alerting that an event has occurred. The method comprises: receiving a user request; interpreting the user request using a semantic engine and determining a request to subscribe to an event contained in the request; determining an event server on the basis of the event; sending to the event server a request to subscribe to the event; receiving a first message associated with an occurrence of the event; sending a second message informing of the occurrence of the event.

7 Claims, 2 Drawing Sheets

(56) References Cited

U.S. PATENT DOCUMENTS

| | | | | |
|---|---|---|---|---|
| 2004/0255302 A1* | 12/2004 | Trossen | ............ | H04L 29/06027 719/318 |
| 2014/0372513 A1* | 12/2014 | Jones | .................... | G06F 9/5072 709/203 |
| 2015/0081361 A1* | 3/2015 | Lee | ....................... | G06F 16/243 705/7.13 |

* cited by examiner

US 11,249,822 B2

METHOD AND DEVICE FOR ALERTING THAT AN EVENT HAS OCCURRED

CROSS-REFERENCE TO RELATED APPLICATIONS

This application is the U.S. national phase of the International Patent Application No. PCT/FR2017/053696 filed Dec. 19, 2017, which claims the benefit of French Application No. 16 62718 filed Dec. 19, 2016, the entire content of which is incorporated herein by reference.

FIELD

The present disclosure relates to the field of chatbots, particularly in the context of event management.

BACKGROUND

A chatbot is a conversational module (programmed or based on artificial intelligence) which allows interacting with a real user in natural language. This interaction may be of any type (example: voice, text, video, etc.).

Natural language is understood to mean the language spoken by humans (as opposed to computer language).

Existing chatbots (or conversational bots) usually allow a user to ask a question. The chatbot then tries to answer or asks the user to clarify the question or confirm what the chatbot has understood.

A chatbot usually runs on a server, and there is a communication channel between the bot and the user (for example a text messaging application, such as FACEBOOK Messenger or SKYPE, or an SMS communication channel) that allows a user to ask the bot questions.

For example, a conversational bot can be used to allow a user to:
  order a train ticket (example: "Hello, I want to reserve a seat in the next Paris-Marseille train");
  check the weather (example: "Hello, do I need to take my umbrella today?");
  find out what movies are currently showing (for example "What is the movie currently showing that has a proton pack and ghosts?").

However, exchanges between bots and users are often transient:
  if a user comes back to talk to the bot several times in succession, the bot has no knowledge of previous exchanges;
  if a user tells the bot a desire/wish, the bot cannot process the information (desire/wish being a future concept).

There is therefore a need to allow the conversational bot to react to a wish previously expressed by the user, when the user is not present.

The present disclosure improves the situation.

SUMMARY

According to a first aspect, it proposes a method for alerting that an event has occurred, implemented by computer means, the method comprising:
  receiving a user request;
  interpreting the user request using a semantic engine and determining a request to subscribe to an event contained in the request;
  determining an event server on the basis of the event;
  sending to the event server a request to subscribe to the event;
  receiving a first message associated with an occurrence of the event;
  sending a second message informing of the occurrence of the event.

The event that is the subject of the user request can thus be asynchronous to the request. The semantic engine does not carry out a simple immediate interaction with the user (i.e. an instant response of the type "Question: What is the weather like?" "Answer: The temperature outside is 20° C.").

On the contrary, the proposed method makes it possible to desynchronize the user's question (or the expression of his or her wish) and the response of the chatbot (example: "Question: Can you warn me when the evening movie on channel 25 is starting?"; "Response (asynchronous): The movie 'The Visitors: Bastille Day' is starting in 5 minutes").

Of course, it is hardly possible to allow for all events a user could request, within the chatbot. The coding complexity of such a chatbot would be too high. Therefore, in one or more embodiments, the chatbot can delegate the event monitoring to another server (called the event server) on the basis of the event requested by the user:
  a television server for events related to television programs;
  a stock exchange server for events related to stock prices;
  a weather alert server for events related to major meteorological events (for example storms, extreme cold, tsunamis, etc.);
  etc.

Once this is done, a specific event server can then be identified on the basis of the event.

Furthermore, in a particular embodiment of the proposed method, the second message may be a message in natural language.

Indeed, sending said second message in natural language allows easy interaction with the user.

In one particular embodiment of the proposed method, the user request may be received via a text communication channel.

Indeed, the interpretation of text messages in natural language has been tested and is easy to implement.

In addition, in one particular embodiment of the proposed method, the semantic engine may be an engine using artificial intelligence.

It is thus possible for specific training of said semantic engine to occur, enabling it to specifically identify a list of predefined events. The recognition rate is therefore improved.

In one particular embodiment, the determination of the server can be carried out by searching an event database.

For this purpose, it is possible to provide a pre-established database (for example, within the chatbot) comprising an association between events (or types of events) and the event server.

Additionally or alternatively, in one or more embodiments the determination of the event server may comprise:
  sending a third message to a query server, the third message comprising the event or a type of event.
  receiving a fourth message from the query server, the fourth message comprising information relating to the event server.

It is thus possible to delegate to a third party server (or query server) the function of identifying the event server to be used based on the event requested. The implementation complexity of the chatbot is subsequently reduced.

A second aspect proposes a device for alerting that an event has occurred, the device comprising:

an interface configured for receiving a user request;

a circuit implementing a semantic engine for interpreting the user request, the semantic engine being able to determine a request to subscribe to an event contained in the request;

a circuit configured for determining an event server on the basis of the event;

an interface configured for sending to the event server a request to subscribe to an event;

an interface configured for receiving a first message associated with an occurrence of the event;

an interface configured for sending a second message informing the user of the occurrence of the event.

A computer program implementing all or part of the method described above, installed on preexisting equipment, is in itself advantageous.

Another aspect therefore proposes a computer program, loadable into a memory associated with a processor, and comprising portions of code for implementing the proposed method when said program is executed by the processor, as well as a set of data representing said computer program, for example in compressed or encoded form.

This program may use any programming language (for example an object-oriented or other language), and be in the form of an interpretable source code, a partially compiled code, or a fully compiled code.

Part of FIG. 1, described in detail below, can form the flowchart of the general algorithm of such a computer program.

Another aspect relates to a non-transitory storage medium for a computer-executable program, comprising a set of data representing one or more programs, said one or more programs comprising instructions for, when said one or more programs are executed by a computer comprising a processing unit operatively coupled with memory means and with an input/output interface module, controlling the computer to alert that an event has occurred according to the proposed method.

BRIEF DESCRIPTION OF THE DRAWINGS

Other features and advantages of the disclosure will become apparent from the following description of some non-limiting embodiments, with reference to the accompanying drawings in which.

DETAILED DESCRIPTION

Figure 1:
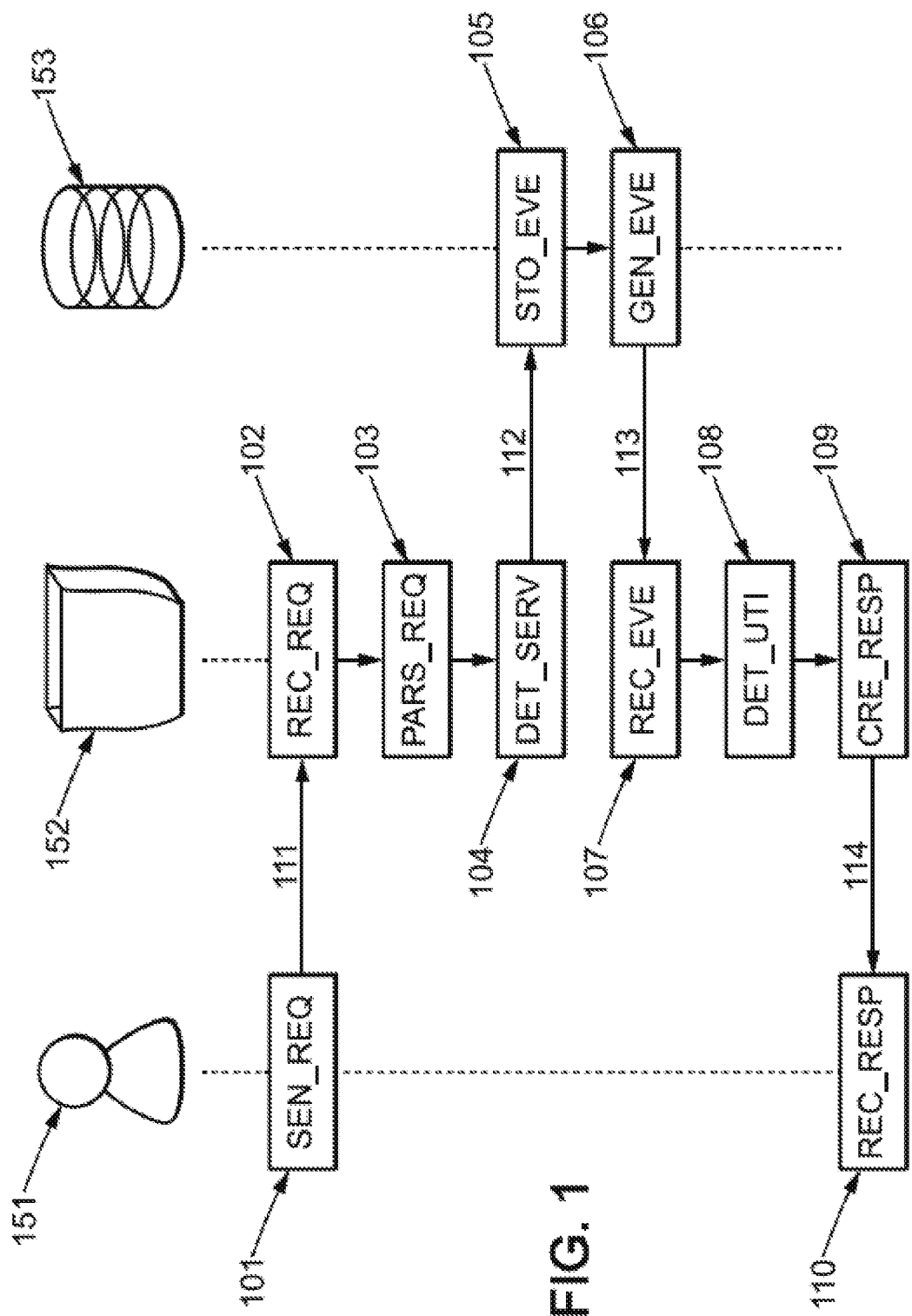
FIG. 1 illustrates a general flowchart for one particular embodiment.

FIG. 1 illustrates a general flowchart for one particular embodiment.

When a user 151 wishes to be warned/alerted of the occurrence of an event, he or she can send (101) the request 111 to a chatbot 152. This request is then expressed in natural language.

This request can be transmitted as text (via a messaging application: email, SMS, FACEBOOK Messenger, TWITTER, etc.), verbally (for example by telephone), or visually (for example by SKYPE).

Upon receiving (102) the request 111, the chatbot 152 interprets it (103) using syntactic and/or semantic analysis to identify the event subscription command.

Such an interpretation can use "NLU" ("Natural Language Understanding") techniques. The chatbot may rely on an artificial intelligence engine, the engine having previously been trained to specifically recognize a list of predefined events, for example.

The events covered by the request of the user may be (this list being non-limiting):

a request for an alert when the share price of a stock is above or below a predefined threshold;

a request for an alert when a file on a server is modified;

a request for an alert when a TV program is about to start;

a request for an alert when a product on an e-commerce site is back in stock;

a request for an alert when the outside temperature is above or below a predefined threshold;

a request for an alert when a user is online/available;

a request for an alert when a bank transfer has been received;

etc.

Of course, if the chatbot has any uncertainties about the subscription command or the event, it can ask the user to clarify the request (not shown).

Once the event has been identified, it is possible to determine the event server that can process this request to subscribe (104):

i. if the chatbot has a database for finding the event server corresponding to the event (or type of event), this determination can be made directly using this database;

ii. if the chatbot does not have such a database or if no match exists in this database, the chatbot may send a message to a third-party server (or query server) so that the latter identifies for it an event server that can process the request to subscribe.

Once the event server 153 is identified, it is possible to send a message 112 informing said event server 153 of the user request. The event server then stores this request (105).

When the event occurs, the event server 153 can then be notified (for example real time database, time database with triggering functions, so-called "push" mechanism). It is also possible for the event server 153 to regularly check the status of the requested event (for example whether it has occurred). The event server 153 can then construct a message 113 (106) to inform the chatbot of the occurrence.

Upon receiving the message 113 (107), the chatbot may perform a number of actions (for example updating a database, updating a billing system, inserting an entry into a log). These actions may be preprogrammed or may depend on the event. It is also possible to determine (108) to which user(s) the event associated with the message 113 (i.e. the user(s) who asked to be notified of the occurrence of the event) corresponds: this information may be contained in the message 113 or this information may have been previously stored by the chatbot in a local database (for example "user X has requested the monitoring of event Y").

Once the user is identified, it is possible to create (109) a message 114, in natural language for example, to inform (110) the user of the occurrence of the event.

According to another aspect, a method for unsubscribing is proposed, for which one or more embodiments can be described in a manner similar to the method for subscribing described in relation to FIG. 1. The preceding considerations then also apply to the proposed method for unsubscribing.

When a user 151 wants to unsubscribe from an event for which he or she is a subscriber, the user can send his or her request to a chatbot 152. This request may be expressed in natural language.

Upon receiving the request to unsubscribe, the chatbot 152 interprets it using syntactic and/or semantic analysis to identify the unsubscribe command.

Of course, if the chatbot has any uncertainties concerning the unsubscribe command or about the event to be unsubscribed from, it can ask the user to clarify the request.

Once the event is identified, it is possible to determine the event server that can handle this request to unsubscribe:
  i. if the chatbot has a database for finding the event server corresponding to the event (or type of event), the determination can be made directly using this database;
  ii. if the chatbot has a database storing the server identified during the subscription phase, the determination can be made directly using this database;
  iii. if the chatbot does not have such databases or if no match exists in this database, the chatbot may send a message to a third-party server (or query server) so that the latter identifies for it an event server that can process the request to unsubscribe, Once the event server 153 is identified, it is possible to send a message informing said event server 153 of the user request. The event server:
  deletes the information indicating that the user has asked to be notified of the occurrence of the event, or
  cancels the user request to be notified of the occurrence of the event.

Of course, if the request to unsubscribe does not correspond to any event to which the user has subscribed, the event server or the bot can ignore the user's request or inform the user of this fact.

The user's request to unsubscribe may be a request to temporarily unsubscribe (for example "Do not notify me of the sale of object X for the next 3 hours"). The bot can thus proceed with the unsubscribe process described above, then once the end of the temporary period is reached, proceed with resubscribing with the event server, or can simply filter the messages from the event server so that it does not transmit the messages 114 during the temporary period.

The request to unsubscribe may be generic (for example "Unsubscribe me from television-related events"). In this case, the conversational bot 152 may identify several events and/or several servers to be unsubscribed from.

Of course, the request to unsubscribe may be more complex (for example generic and temporary).

Figure 2:
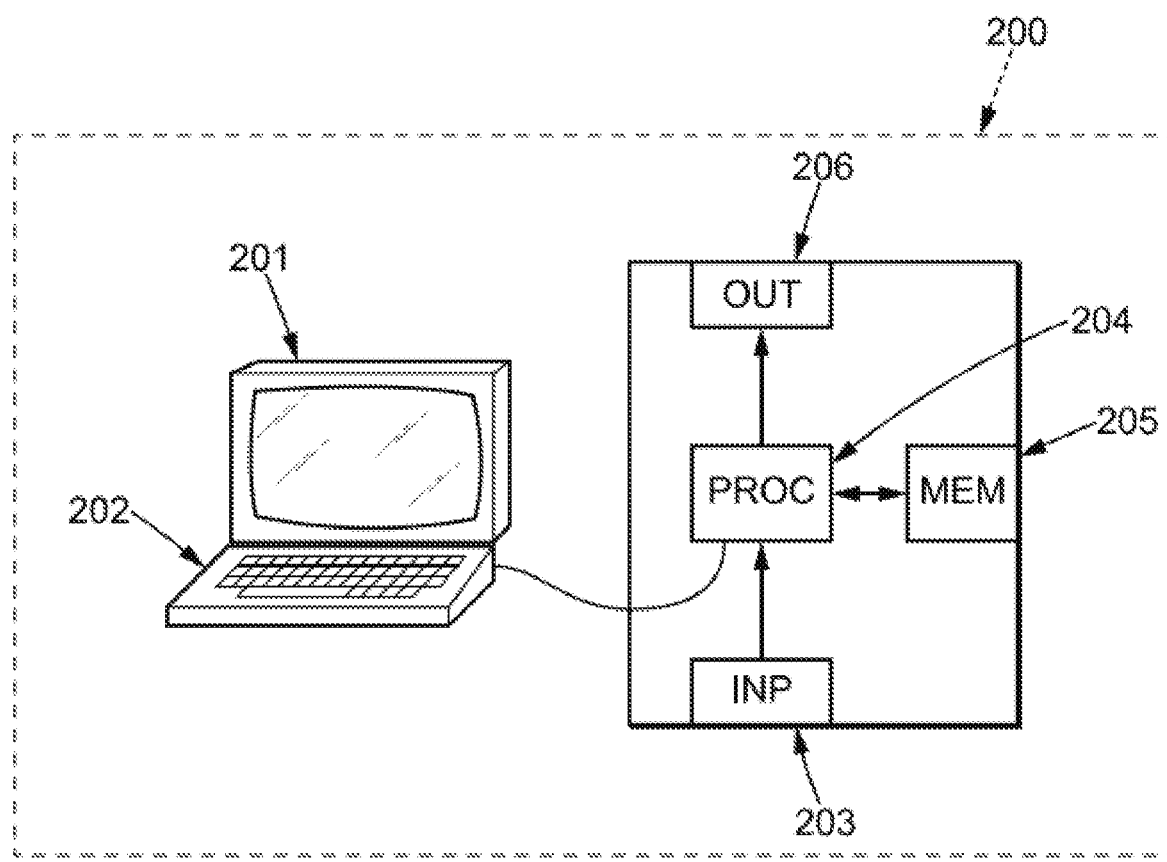
FIG. 2 illustrates one particular embodiment of an exemplary device for implementing the methods described herein.

FIG. 2 shows an example of a device in one particular embodiment for implementing the methods described herein.

In this embodiment, the device 200 comprises a memory 205 for storing instructions enabling implementation of the proposed method, and for storing temporary data for executing the various embodiments of the proposed method as described above.

The device further comprises a control circuit 204. This control circuit may be, for example:
  a processor capable of interpreting instructions in the form of a computer program, or
  a circuit board configured by defining the proposed method in the silicon, or
  a programmable electronic chip such as an FPGA chip ("Field Programmable Gate Array").

The device comprises an input interface 203 for receiving the user request (in particular), and an output interface 206 for providing the message informing the user of the occurrence of the event. Finally, the device may include a screen 201 and a keyboard 202, to enable easy interaction with a user. The keyboard is of course optional, particularly in the context of a device in the form of a server, for example.

Depending on the embodiment, the device 200 may be a computer, a computer network, an electronic component, or another device comprising a processor operatively coupled to a memory, as well as, depending on the embodiment chosen, a data storage unit, and other associated hardware elements such as a network interface and a media player for reading a removable storage medium and for writing on such a medium (not shown in the Figure). The removable storage medium may be, for example, a compact disc (CD), a digital versatile/video disc (DVD), a flash drive, a USB stick, etc. Depending on the embodiment, the memory, the data storage unit, or the removable storage medium contains instructions which, when executed by the control circuit 204, cause this control circuit 204 to execute or control the input interface 203, output interface 206, data storage 205, and/or data processing portions of the exemplary implementations of the proposed method which are described herein. The control circuit 204 may be a component implementing a processor or a computing unit for alerting that an event has occurred according to the proposed method, and for controlling units 203, 205, and 206 of the device 200.

In addition, the device 200 may be implemented in software form, in which case it takes the form of a program executable by a processor; or in hardware form, as an application specific integrated circuit (ASIC), a system-on-chip (SOC); or in a combination of hardware and software elements, for example such as a software program intended to be loaded and executed on a FPGA (Field Programmable Gate Array) component. The Systems-On-Chip (SOC) are embedded systems which integrate all components of an electronic system into a single chip. An Application Specific Integrated Circuit (ASIC) is a specialized electronic circuit which combines custom functionalities for a given application. ASICs are generally configured during manufacture and can only be simulated by the user. Field Programmable Gate Arrays (FPGA) are electronic circuits that are reconfigurable by the user.

The device 200 may also use hybrid architectures, such as architectures based on a CPU+FPGA, a GPU (Graphics Processing Unit), or a MPPA (Multi-Purpose Processor Array).

The functional diagram presented in FIG. 1 is a typical example of a program in which certain instructions can be carried out in the alert device described. In this capacity, FIG. 1 can correspond to the flowchart of the general algorithm of a computer program in one particular embodiment.

Of course, the present disclosure is not limited to the embodiments described above as examples; it extends to other variants.

Other implementations are possible.

Depending on the embodiment chosen, certain acts, actions, events, or functions of each of the methods described in this document may be carried out or may occur in an order different from the one that has been described, or may be added, merged, or may not be performed or take place, depending on the case. In addition, in some embodiments, certain acts, actions, or events are carried out or occur concurrently and not successively.

Although described by means of a number of detailed embodiments, the proposed alert method and the devices for implementing the method comprise various variants, modifications, and improvements which will be obvious to the skilled person, it being understood that these various variants, modifications, and improvements are within the scope of the disclosure, as defined by the following claims. In addition, various aspects and features described above may be implemented together or separately, or substituted for each other, and all of the various combinations and subcombinations of the aspects and features are within the scope of the disclosure. Furthermore, some of the systems and equipment described above may not incorporate all the modules and functions described for the preferred embodiments.

The invention claimed is:

1. A method for alerting that an event has occurred, the method implementing a chatbot by a computer system and a database for finding an event server corresponding to the event, the method comprising:
  receiving via the chatbot a user request;
  interpreting the user request using a semantic engine and determining a request to subscribe the user to an event contained in the request;
  identifying the event contained in the request;
  determining the event server from a plurality of event servers on the basis of the event identified, said determining using said database, the determination of the event server comprising:
    determining that no match between the event server and the event exists in said database;
    once determined that no match between the event server and the event exists in said database,
    sending via the chatbot a first message to a third party server, the first message comprising the event; and
    receiving via the chatbot a second message from the third party server, the second message comprising information relating to the event server;
  delegating event monitoring to the determined event server;
  sending to the determined event server a request to subscribe the user to the event;
  receiving, originating from the determined event server, a third message associated with an occurrence of the event;
  sending to the user a fourth message informing of the occurrence of the event.

2. The method according to claim 1, wherein the fourth message is a message in natural language.

3. The method according to claim 1, wherein the user request is received via a text communication channel.

4. The method according to claim 1, wherein the semantic engine is an engine using artificial intelligence.

5. The method according to claim 1, wherein the determination of the server is carried out by searching in an event database.

6. An electronic device for alerting that an event has occurred, the electronic device implementing a chatbot, the electronic device comprising:
  a database for finding an event server corresponding to the event;
  a first interface configured for receiving via the chatbot a user request;
  a circuit implementing a semantic engine for interpreting the user request, the semantic engine being able to determine a request to subscribe the user to the event contained in the request, and identifying the event contained in the request;
  a circuit configured for determining the event server from a plurality of event servers on the basis of the event identified; said determining using said database, and for delegating event monitoring to the determined event server, the circuit configured for determining the event server being further configured for:
    determining that no match between the event server and the event exists in said database;
    once determined that no match between the event server and the event exists in said database, sending via the chatbot a first message to a third party server which has the function of identifying the event server, the first message comprising the event; and
    receiving via the chatbot a second message from the third party server, the second message comprising information relating to the event server;
  a second interface configured for sending to the event server a request to subscribe the user to the event;
  a third interface configured for receiving, originating from the determined event server, a third message associated with an occurrence of the event;
  a fourth interface configured for sending to the user a fourth message informing the user of the occurrence of the event.

7. A non-transitory computer-readable storage medium having stored thereon computer-executable instructions for carrying out a method for alerting that an event has occurred, the method implemented by a chatbot comprising a database for finding an event server corresponding to the event, the method comprising the steps of:
  receiving via the chatbot a user request;
  interpreting the user request using a semantic engine and determining a request to subscribe the user to an event contained in the request;
  identifying the event contained in the request;
  determining an event server from a plurality of event servers on the basis of the event identified, said determining using said database, the determination of the event server comprising:
    determining that no match between the event server and the event exists in said database;
    once determined that no match between the event server and the event exists in said database, sending via the chatbot a first message to a third party server which has the function of identifying the event server, the first message comprising the event;
    receiving via the chatbot a second message from the third party server, the second message comprising information relating to the event server;
  delegating event monitoring to the determined event server;
  sending to the determined event server a request to subscribe the user to the event;
  receiving, originating from the determined event server, a third message associated with an occurrence of the event;
  sending to the user a fourth message informing of the occurrence of the event.

* * * * *